(12) United States Patent
Barbiero et al.

(10) Patent No.: US 8,301,813 B2
(45) Date of Patent: Oct. 30, 2012

(54) METHOD AND DEVICE FOR DISABLING A HIGHER VERSION OF A COMPUTER BUS AND INTERCONNECTION PROTOCOL FOR INTEROPERABILITY WITH A DEVICE COMPLIANT TO A LOWER VERSION OF THE COMPUTER BUS AND INTERCONNECTION PROTOCOL

(75) Inventors: Natale Barbiero, Toronto (CA); Gordon F. Caruk, Brampton (CA)

(73) Assignee: ATI Technologies ULC, Markham, Ontario (CA)

( * ) Notice: Subject to any disclaimer, the term of this patent is extended or adjusted under 35 U.S.C. 154(b) by 301 days.

(21) Appl. No.: 12/647,047

(22) Filed: Dec. 24, 2009

(65) Prior Publication Data

US 2011/0161547 A1    Jun. 30, 2011

(51) Int. Cl.
*G06F 13/00*    (2006.01)
(52) U.S. Cl. ........................................ 710/104
(58) Field of Classification Search .................... 710/104
See application file for complete search history.

(56) References Cited

U.S. PATENT DOCUMENTS

| | | | | |
|---|---|---|---|---|
| 7,461,195 B1 * | 12/2008 | Woodral | | 710/313 |
| 8,161,429 B1 * | 4/2012 | Chan et al. | | 716/100 |
| 2005/0256989 A1 * | 11/2005 | Wolfe et al. | | 710/306 |
| 2007/0008898 A1 * | 1/2007 | Sharma et al. | | 370/252 |
| 2007/0192505 A1 * | 8/2007 | Dalmia | | 709/233 |
| 2008/0034137 A1 * | 2/2008 | Whitby-Strevens | | 710/100 |
| 2008/0288664 A1 * | 11/2008 | Pettey et al. | | 710/5 |
| 2008/0294831 A1 * | 11/2008 | Mao | | 710/307 |
| 2009/0010253 A1 * | 1/2009 | Kobayashi | | 370/389 |
| 2009/0109219 A1 * | 4/2009 | DeCoro et al. | | 345/423 |
| 2010/0031098 A1 * | 2/2010 | Kobayashi | | 714/715 |
| 2010/0250915 A1 * | 9/2010 | La Fetra | | 713/100 |

* cited by examiner

*Primary Examiner* — Glenn A Auve
*Assistant Examiner* — Nimesh G Patel
(74) *Attorney, Agent, or Firm* — Vope and Koeing, P.C.

(57) ABSTRACT

A method and a device for disabling a lower version of a computer bus and interconnection protocol (e.g., Peripheral Component Interconnect Express (PCIe) 2.0 or higher) for interoperability with a receiver compliant to a lower version of the protocol are disclosed. The device detects a presence of a receiver, and starts link training. During the link training, the number of link training failures or the elapsed time is counted. The device transmits a training sequence including symbols set in accordance with a higher version of the protocol that the device supports on each lane that the receiver is detected as long as the number of link training failures or the elapsed time is below a predetermined threshold. If the number of link training failures or the elapsed time reaches a predetermined threshold, the device transmits a training sequence including symbols set in accordance with a lower version of the protocol.

24 Claims, 2 Drawing Sheets

METHOD AND DEVICE FOR DISABLING A HIGHER VERSION OF A COMPUTER BUS AND INTERCONNECTION PROTOCOL FOR INTEROPERABILITY WITH A DEVICE COMPLIANT TO A LOWER VERSION OF THE COMPUTER BUS AND INTERCONNECTION PROTOCOL

FIELD OF INVENTION

This application is related to a computer bus and interconnection protocol, such as Peripheral Component Interconnect Express (PCIe), HyperTransport, or the like.

BACKGROUND

In a computer system, various buses are provided for interconnecting a host processor(s) and other devices and transferring data among them. As an example, PCIe has been developed for replacing the older Peripheral Component Interconnect (PCI) and PCI-X standards. PCIe is used in consumer, server, and industrial applications as a motherboard-level interconnect to link motherboard-mounted peripherals and as an expansion card interface for add-in boards.

A difference between PCIe and earlier PCI or PCI-X buses is a topology based on point-to-point serial links, rather than a shared parallel bus architecture. PCIe can be thought of as a high-speed serial replacement of the older parallel PCI and PCI-X bus. At the software-level, PCIe preserves compatibility with PCI so that a PCIe device can be configured and used in legacy applications and operating systems which have no direct knowledge of the new features of PCIe.

In PCIe 1.0 or 1.1, each lane carries 250 MB/s. PCIe 2.0, released in late 2007, adds a second generation signaling mode, doubling the rate to 500 MB/s. PCIe 3.0, currently in development, will add a third generation signaling mode at 1 GB/s.

PCIe 2.0 and 3.0 also maintain compatibility with the earlier generation of PCIe (i.e., PCIe 1.x). Since PCIe 1.x compatible devices are still being used in the market, PCIe 2.0 or 3.0 compatible devices may need to be connected with PCIe 1.x compatible devices. Upon power up or in certain conditions, the devices at both ends of the link perform link training and initialization. Conventionally, for backward compatibility with PCIe 1.x, the PCIe 2.0 or PCIe 3.0 devices initially advertise themselves as PCIe 1.1 devices. Upon training the PCIe link, the software determines whether the device on the other end of the link supports the PCIe 2.0 or PCIe 3.0 specification. If so, part of the training sequences have to be repeated with the PCIe 2.0 or PCIe 3.0 settings that were initially advertised with PCIe 1.1 settings. This is not desirable because of the high software overhead required to support the compatibility with the PCIe 1.x compatible devices.

SUMMARY

Embodiments of the invention include a method and a computer bus and interconnection protocol (e.g., PCIe) compliant device for disabling a higher version of the protocol (e.g., PCIe 2.0 or higher, or higher version of HyperTransport) for interoperability with a receiver compliant to a lower version of the protocol (e.g., PCIe 1.x or lower version of HyperTransport) are disclosed. In an embodiment, the PCIe compliant device detects a presence of a receiver on each lane of a link, and starts a link training procedure. During the link training procedure, the number of link training failures may be counted. The PCIe compliant device transmits a training sequence, including symbols set in accordance with a most recent version of the PCIe protocol that the PCIe compliant device supports, on each lane on which a receiver is detected as long as the number of link training failures is below a predetermined threshold. If the number of link training failures reaches a predetermined threshold, the device transmits a training sequence including symbols set in accordance with a lower version of the PCIe protocol.

In an embodiment the training sequence may be TS1 ordered sets or TS2 ordered sets. During the link training procedure, at least one of Bits 2, 3, 6, and 7 of a rate ID symbol of the TS1 or TS2 ordered sets may be set in accordance with PCIe 2.0 or PCIe 3.0 as long as the number of link training failures is below the predetermined threshold, and at least one of Bits 2, 3, 6, and 7 of a rate ID symbol of the TS1 or TS2 ordered sets may be set in accordance with PCIe 1.x on a condition that the number of link training failures reaches the predetermined threshold. Alternatively, at least one of Bits 0 and 4-7 of a training control symbol of the TS1 or TS2 ordered sets may be set in accordance with PCIe 2.0 or PCIe 3.0 as long as the number of link training failures is below the predetermined threshold, and at least one of Bits 0 and 4-7 of a training control symbol of the TS1 or TS2 ordered sets may be set in accordance with PCIe 1.x on a condition that the number of link training failures reaches the predetermined threshold.

BRIEF DESCRIPTION OF THE DRAWINGS

A more detailed understanding may be had from the following description, given by way of example in conjunction with the accompanying drawings wherein.

DETAILED DESCRIPTION

Embodiments disclosed herein allow devices compliant to a higher version of computer bus and interconnection protocol (such as PCIe 2.0 and PCIe 3.0 compliant devices) to be interoperable with devices compliant to a lower version of the protocol (such as PCIe 1.x compliant devices). Hereafter, the embodiments will be explained with reference to PCIe protocol. However, it should be noted that the embodiments are applicable to any computer bus and interconnection protocols including, but not limited to, PCIe, HyperTransport, etc. The embodiments disclosed herein may be applied to any versions of the computer bus and interconnection protocols. For example, the embodiments may be applied for interoperability between PCIe 1.x and PCIe 2.0/3.0 compliant devices, or between PCIe 2.0 and PCIe 3.0 compliant devices, and may be extended to the later versions of the PCIe protocol that may be developed in the future.

A PCIe 2.0 or 3.0 compliant device indicates support for the most recent version of the PCIe protocol that the device supports during link training and initialization. When the PCIe device is unable to train its link after a pre-determined number of attempts, the advertised settings are reverted to the lower version of the PCIe protocol such that the PCIe device appears as compliant to the lower PCIe protocol.

Figure 1:
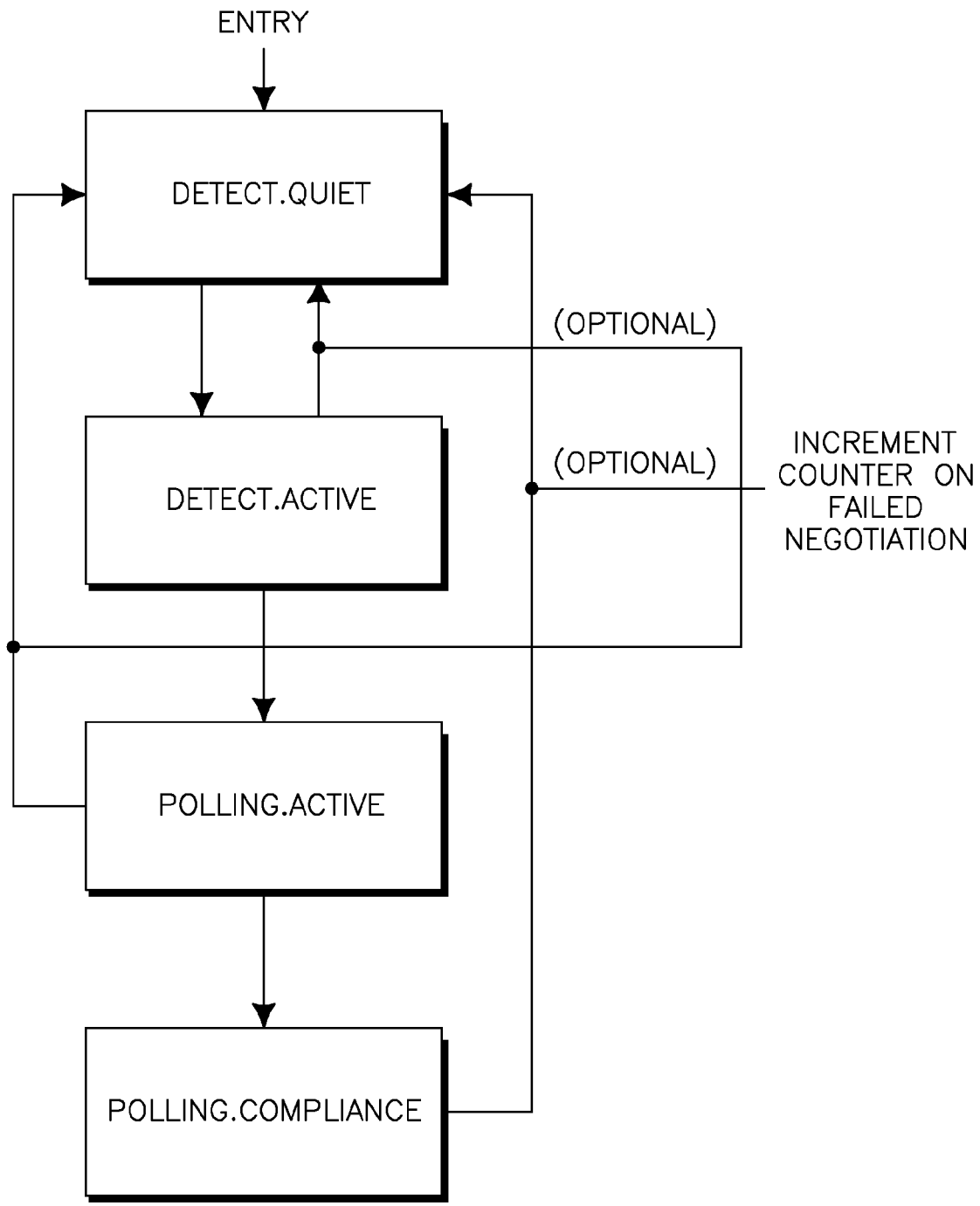
FIG. 1 shows state transitions of the link training and status state machine (LTSSM) and incrementing a counter in accordance with one embodiment.

FIG. 1 shows state transitions of the link training and status state machine (LTSSM) and incrementing a counter in accordance with one embodiment. The LTSSM transitions include Detect.Quiet, Detect.Active, Polling.Active, Polling.Compliance, and other states (not shown).

The Detect.Quiet state is the initial state at power-on or after reset. The Detect.Quiet state may be entered from the Detect.Active, Polling.Active or Polling.Compliance states if these states do not complete successfully. The Detect.Quiet state may also be entered from other states, such as Configuration, Recover, Disable, Loopback states, etc. (not shown in FIG. 1). After a 12 millisecond (ms) timeout or when the link exits the electrical idle state, the state transitions from Detect.Quiet to Detect.Active.

During the Detect.Active state, the device detects if a receiver is connected on the lanes of the link. If a receiver is detected on the link, the state transitions to Polling.Active. If a receiver is not detected on the link, the state transitions back to Detect.Quiet.

During the Polling.Active state, the device transmits training sequences (training sequence 1 (TS1) ordered sets) on all connected lanes of the link for link training. In accordance with one embodiment, the device initially transmits the TS1 ordered sets with symbols set in accordance with the higher version (e.g., the most recent version) of the PCIe protocol that the device supports (e.g., PCIe 2.0 or PCIe 3.0). If the link training failure occurs, the state transitions back to Detect.Quiet and the link training procedure starts again. The transition from Detect.Quiet to Detect.Active to Polling.Active is repeated and TS1 ordered sets with symbols set in accordance with the higher version (e.g., the most recent version) of PCIe protocol that the device supports are repeatedly transmitted as long as a certain condition is not met, for example, the maximum number of link training failures have not occurred or a time elapsed since transmission of the first training sequence or a certain event (e.g., state transition) does not reach a predetermined threshold. If the condition is met (e.g., the maximum number of training failures have occurred or the elapsed time reaches the predetermined threshold), the device transmits the TS1 ordered sets with symbols set in accordance with a lower version of the PCIe protocol (e.g., PCIe 1.x).

Figure 2:
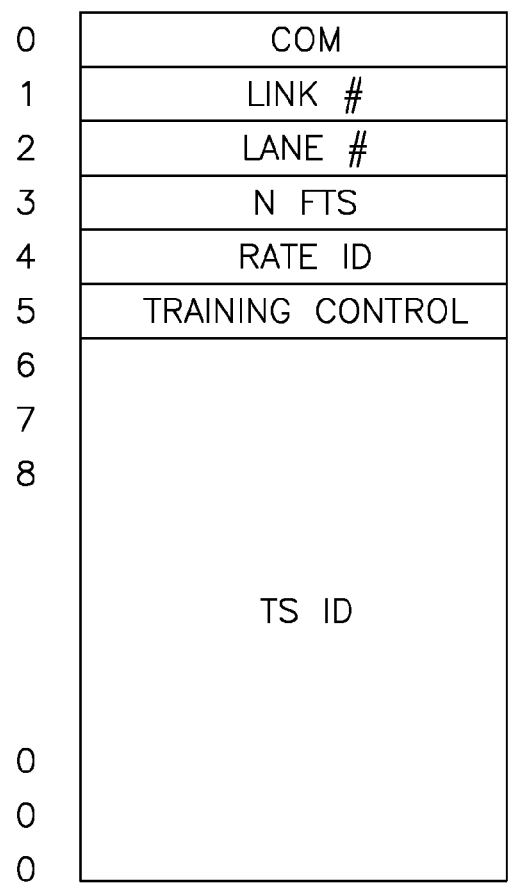
FIG. 2 shows a TS1 or TS2 ordered set.

FIG. 2 shows a TS1 (or TS2) ordered set. TS1 and TS2 ordered sets are a 16 byte packet. The packet structure of the TS1 and the TS2 are the same except for the training sequence identity (TS ID). The TS1 (or TS2) packet includes a COM symbol, a link number, a lane number, an N fast training sequence (FTS), a rate ID, a training control symbol, and ten repetitions of the TS ID.

The rate ID symbol indicates the data transfer rate that the device supports. Under the PCIe 1.x specification, Bit 1, when set, indicates that the device supports 2.5 gigabits per second (Gbits/s) of transfer rate, and Bits 0 and 2-7 are reserved. Under PCIe 2.0 (and PCIe 3.0), Bit 2, when set, indicates that the device supports 5 Gbits/s of transfer rate; Bit 3, when set, indicates that the device supports 8 Gbits/s of transfer rate (under PCIe 3.0); Bit 6, when set, indicates Link Upconfigure capability, meaning that the device is capable of increasing the link width; and Bit 7, when set, indicates a request to change the speed of operation.

The training control symbol is used to communicate additional information. Under the PCIe 1.x specification, Bit 0 is set (or un-set) to assert (or de-assert) hot reset, Bit 1 is set (or un-set) to assert (or de-assert) link disable, Bit 2 is set (or un-set) to assert (or de-assert) enable loopback, Bit 3 is set (or un-set) to assert (or de-assert) disable scrambling, and the remainder of the bits of the training control symbol are reserved. Bit 4 is set (or un-set) to assert (or de-assert) compliance receive under PCIe 2.0, and the remaining bits are reserved.

In accordance with one embodiment, after detecting the receiver on the lanes of the link, the device (initially at the Polling.Active state), transmits TS1 ordered sets with PCIe 2.0 or PCIe 3.0 compatible symbols. The reserved bits in the PCIe 1.x specification are set to the appropriate values under PCIe 2.0/3.0 depending on the capability or configuration of the device. For example, Bit 2 of the rate ID symbol may be set to indicate 5.0 Gbits/s support of the device, or Bit 3 of the rate ID symbol may be set to indicate 8.0 Gbits/s support of the device. Bits 6 and 7 of the rate ID symbol may also be set appropriately to indicate the capability of the device.

In addition, the reserved bits (e.g., Bit 4) of the training control symbol under PCIe 1.x may also be set in accordance with PCIe 2.0 or 3.0. This may cause a link training failure at the receiver on the other side of the link and the receiver may not operate properly, which may cause a timeout.

The PCIe protocol expects reserved bits to be unset to '0' on the transmitting end of the link and they should be ignored by the receiving end of the link. Certain PCIe 1.x compliant devices may check that the received reserved bits are indeed set to '0', and when they are not set to '0' (due to the fact that the transmitting side of the link is a PCIe 2.0 or 3.0 compliant device), the training sets may not be accepted and eventually the link may time out and transition to the Detect.Quiet state. When the link training failure occurs, the LTSSM state transitions back to the Detect.Quiet state and the link training procedure starts again.

A counter may be used to count the number of link training failures. Each time the link training failure occurs (i.e., the LTSSM state transitions from Polling.Active to Detect.Quiet), the counter may be incremented (if an incrementing counter is used). The counter may be cleared if the LTSSM state transitions to an L0 state. If the counter value is below (or not greater than) a predetermined threshold (e.g., 32), the device transmits the TS1 ordered sets with PCIe 2.0 or 3.0 compatible symbols in the subsequent link training. If the counter value reaches (or exceeds) the threshold, the device reverts to the PCIe 1.x setting and transmits the TS1 ordered sets with the PCIe 1.x setting.

It should be noted that the counter may be an incrementing counter or a decrementing counter. In case of a decrementing counter, the counter may be initialized to the predetermined threshold value and decrements each time the link failure occurs and the device reverts to PCIe 1.x setting if the counter reaches a predetermined value (e.g., zero).

The LTSSM transitions to Polling.Compliance from Polling.Active if certain conditions are met. During the Polling.Compliance, the device generates a compliance pattern on all lanes that detected the receiver. The LTSSM transitions from Polling.Active to Polling.Compliance when (1) the "Enter Compliance" configuration register is set to '1', (2) less than a predetermined number of lanes have detected an exit from electrical idle, or (3) any lane that detected a receiver during the Detect state receives eight consecutive TS1 ordered sets with link and lane numbers set to "PAD," the Compliance Receive bit set to '1,' and the Loopback bit set to '0'. The counter may optionally be incremented (or decremented) each time the state transitions from Polling.Compliance to Detect.Quiet.

Optionally, the counter may also be incremented (or decremented) when the state transitions from Detect.Active to Detect.Quiet. Alternatively, instead of having the counter incremented (or decremented) each time the state transitions to Detect.Quiet from Polling.Active, Polling.Compliance, or Detect.Active, the counter may be incremented (or decremented) each time the state transitions from Detect.Active to Polling.Active.

The embodiments may also be implemented for compatibility between PCIe 2.0 and PCIe 3.0 or any future version of PCIe standards compliant devices. For example, the device may initially transmit TS1 or TS2 ordered sets with PCIe 3.0 compatible symbols and may revert back to PCIe 2.0 compatible symbols after the predetermined number of link training failures. The embodiments may also be implemented for compatibility between any computer bus and interconnection protocols such as HyperTransport, etc.

Figure 3:
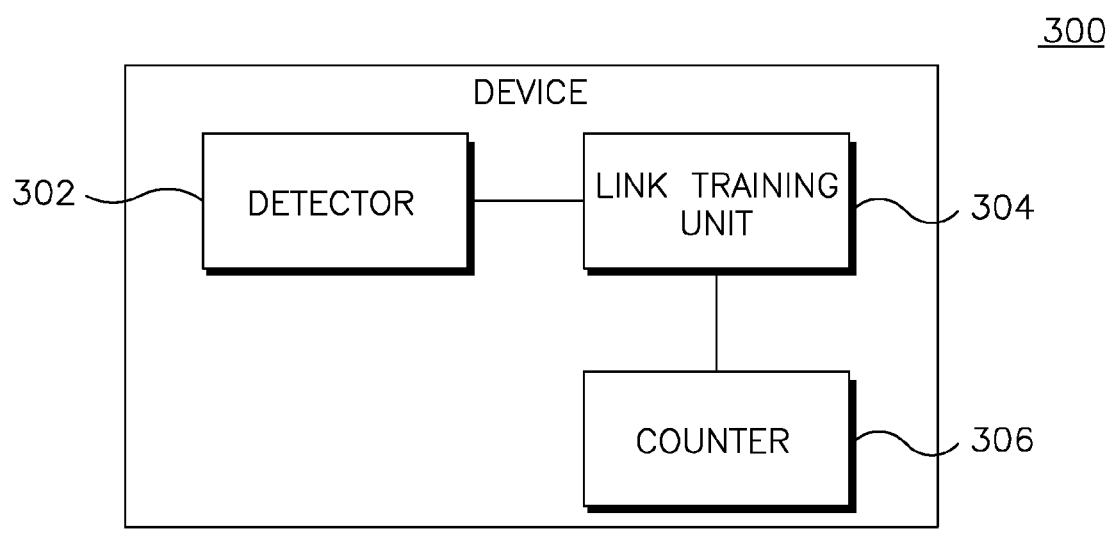
FIG. 3 is a block diagram of an example device in accordance with one embodiment.

FIG. 3 is a block diagram of an example device 300 configured to perform the method for disabling a higher version of a computer bus and interconnection protocol (such as PCIe 2.0 or higher or higher version of HyperTransport) for interoperability with a receiver compliant to a lower version of the computer bus and interconnection protocol (such as PCIe 1.x or lower version of HyperTransport) in accordance with the embodiments disclosed herein. The device 300 includes a detector 302, a link training unit 304, and a counter (optional) 306. The device 300 may be, or may be included in, any device including, but not limited to switch, bridge, graphics card, northbridge, southbridge, and the like. The detector 302 is configured to detect the presence of a receiver on the other side of a link. The counter 306 may be provided for counting the number of link training failures (e.g., LTSSM state transitions to Detect.Quiet from Polling.Active, Polling.Compliance, or Detect.Active, or LTSSM state transitions from Detect.Active to Polling.Active). Alternatively, a timer may be used instead of the counter 306. The link training unit 304 is configured to transmit a training sequence (TS1 and TS2 ordered sets) including symbols set in accordance with a most recent version of PCIe protocol that the PCIe compliant device supports on a condition that the number of link training failures is below a predetermined threshold, and transmit a training sequence including symbols set in accordance with a lower version of PCIe protocol on a condition that the number of link training failures reaches the predetermined threshold. If a timer is used instead of the counter, the link training unit 304 transmits a training sequence including symbols set in accordance with a lower version of the PCIe protocol on a condition that the time elapsed reaches a predetermined threshold.

The embodiments eliminate the need for the software to be inundated with performing checks to verify the support level of the PCIe components at the other end of the link. The embodiments also expedite PCIe link training when both ends of the link behave in a compliant fashion because the link training would only have to be executed once.

Currently, the vast majority of electronic circuits are designed and manufactured by using software (e.g., hardware description language (HDL)). HDL is a computer language for describing structure, operation, and/or behavior of electronic circuits. The device 300 (i.e., the electronic circuit) may be designed and manufactured by using software (e.g., HDL). HDL may be any one of the conventional HDLs that are currently being used or will be developed in the future. A set of instructions are generated with the HDL to describe the structure, operation, and/or behavior of the device 300. The set of instructions may be stored in any kind of computer-readable storage medium.

Although features and elements are described above in particular combinations, each feature or element can be used alone without the other features and elements or in various combinations with or without other features and elements. The methods may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method implemented in a first device for disabling a higher version of a computer bus and interconnection protocol for interoperability with a second device which is compliant to a lower version of the computer bus and interconnection protocol, the method comprising:

detecting a presence of the second device on each lane of a link;

transmitting a training sequence including symbols set in accordance with the higher version of the computer bus and interconnection protocol that the first device supports on each lane on which the second device is detected; and transmitting a training sequence including symbols set in accordance with the lower version of the computer bus and interconnection protocol on each lane on which the second device is detected on a condition of unsuccessful link training.

2. The method of claim 1, further comprising:

counting a number of link training failures, wherein the first device transmits a training sequence including symbols set in accordance with the lower version of the computer bus and interconnection protocol on a condition that the number of link training failures reaches a predetermined threshold.

3. The method of claim 1, further comprising:

calculating a time elapsed since transmission of the training sequence set in accordance with the higher version of the computer bus and interconnection protocol, wherein the first device transmits a training sequence including symbols set in accordance with the lower version of the computer bus and interconnection protocol on a condition that the time elapsed reaches a predetermined threshold.

4. The method of claim 1, wherein the computer bus and interconnection protocol is Peripheral Component Interconnect Express (PCIe) or HyperTransport.

5. The method of claim 4, further comprising:

counting a number of link training failures, wherein the first device transmits a training sequence including symbols set in accordance with the lower version of the computer bus and interconnection protocol on a condition that the number of link training failures reaches a predetermined threshold and the number of link training failures is updated each time a link training and status state machine transitions from Polling.Active to Detect.Quiet.

6. The method of claim 4, further comprising:

counting a number of link training failures, wherein the first device transmits a training sequence including symbols set in accordance with the lower version of the computer bus and interconnection protocol on a condition that the number of link training failures reaches a predetermined threshold and the number of link training failures is updated each time a link training and status state machine transitions to Polling.Active.

7. The method of claim 4, further comprising:
counting a number of link training failures, wherein the first device transmits a training sequence including symbols set in accordance with the lower version of the computer bus and interconnection protocol on a condition that the number of link training failures reaches a predetermined threshold and the number of link training failures is updated each time a link training and status state machine transitions from Polling.Compliance to Detect.Quiet.

8. The method of claim 1, wherein the training sequence is TS1 ordered sets or TS2 ordered sets.

9. The method of claim 8, wherein at least one of Bits 2, 3, 6, or 7 of a rate ID symbol of the TS1 or TS2 ordered sets is set in accordance with PCIe 2.0 or PCIe 3.0 as long as a number of link training failures is below a predetermined threshold, and at least one of Bits 2, 3, 6, or 7 of a rate ID symbol of the TS1 or TS2 ordered sets is set in accordance with PCIe 1.x on a condition that the number of link training failures reaches the predetermined threshold.

10. The method of claim 8, wherein at least one of Bits 0 or 4-7 of a training control symbol of the TS1 or TS2 ordered sets is set in accordance with PCIe 2.0 or PCIe 3.0 as long as a number of link training failures is below a predetermined threshold, and at least one of Bits 0 or 4-7 of the training control symbol of the TS1 or TS2 ordered sets is set in accordance with PCIe 1.x on a condition that the number of link training failures reaches the predetermined threshold.

11. A device configured to disable a higher version of a computer bus and interconnection protocol for interoperability with a receiver compliant to a lower version of the computer bus and interconnection protocol, the device comprising:
a detector configured to detect a presence of the receiver on each lane of a link; and
a link training unit configured to transmit a training sequence including symbols set in accordance with the higher version of the computer bus and interconnection protocol that the device supports on each lane on which the receiver is detected, and transmit a training sequence including symbols set in accordance with the lower version of the computer bus and interconnection protocol on each lane on which the receiver is detected on a condition of unsuccessful link training.

12. The device of claim 11, further comprising:
a counter for counting a number of link training failures, wherein the link training unit transmits the training sequence including symbols set in accordance with the lower version of the computer bus and interconnection protocol on a condition that the number of link training failures reaches a predetermined threshold.

13. The device of claim 11, further comprising:
a timer for calculating a time elapsed since transmission of the training sequence set in accordance with the higher version of the computer bus and interconnection protocol, wherein the link training unit transmits a training sequence including symbols set in accordance with the lower version of the computer bus and interconnection protocol on a condition that the time elapsed reaches a predetermined threshold.

14. The device of claim 11, wherein the computer bus and interconnection protocol is Peripheral Component Interconnect Express (PCIe) or HyperTransport.

15. The device of claim 14, wherein the training sequence is TS1 ordered sets or TS2 ordered sets.

16. The device of claim 15, wherein the link training unit is configured to set at least one of Bits 2, 3, 6, or 7 of a rate ID symbol of the TS1 or TS2 ordered sets in accordance with PCIe 2.0 or PCIe 3.0 as long as a number of link training failures is below a predetermined threshold, and set at least one of Bits 2, 3, 6, or 7 of a rate ID symbol of the TS1 or TS2 ordered sets in accordance with PCIe 1.x on a condition that the number of link training failures reaches the predetermined threshold.

17. The device of claim 15, wherein the link training unit is configured to set at least one of Bits 0 or 4-7 of a training control symbol of the TS1 or TS2 ordered sets in accordance with PCIe 2.0 or PCIe 3.0 as long as a number of link training failures is below a predetermined threshold, and set at least one of Bits 0 or 4-7 of the training control symbol of the TS1 or TS2 ordered sets in accordance with PCIe 1.x on a condition that the number of link training failures reaches the predetermined threshold.

18. The device of claim 14, further comprising:
a counter for counting a number of link training failures, wherein the link training unit transmits the training sequence including symbols set in accordance with the lower version of the computer bus and interconnection protocol on a condition that the number of link training failures reaches a predetermined threshold and the counter is updated each time a link training and status state machine transitions from Polling.Active to Detect.Quiet.

19. The device of claim 14, further comprising:
a counter for counting a number of link training failures, wherein the link training unit transmits the training sequence including symbols set in accordance with the lower version of the computer bus and interconnection protocol on a condition that the number of link training failures reaches a predetermined threshold and the counter is updated each time a link training and status state machine transitions to Polling.Active.

20. The device of claim 14, further comprising:
a counter for counting a number of link training failures, wherein the link training unit transmits the training sequence including symbols set in accordance with the lower version of the computer bus and interconnection protocol on a condition that the number of link training failures reaches a predetermined threshold and the counter is updated each time a link training and status state machine transitions from Polling.Compliance to Detect.Quiet.

21. A non-transitory computer-readable storage medium storing a set of instructions for execution by a general purpose computer to disable a higher version of computer bus and interconnection protocol in a first device for interoperability with a second device which is compliant to a lower version of the computer bus and interconnection protocol, the set of instructions comprising:
a detecting code segment for detecting a presence of the second device on each lane of a link;
a first transmitting code segment for transmitting a training sequence including symbols set in accordance with the higher version of the computer bus and interconnection protocol that the first device supports on each lane on which the second device is detected; and
a second transmitting code segment for transmitting a training sequence including symbols set in accordance with the lower version of the computer bus and interconnection protocol on each lane on which the second device is detected on a condition of unsuccessful link training.

22. The non-transitory computer-readable storage medium of claim 21, the set of instructions further comprising:

a counting code segment for counting a number of link training failures, wherein the first device transmits a training sequence including symbols set in accordance with the lower version of the computer bus and interconnection protocol on a condition that the number of link training failures reaches a predetermined threshold.

23. The non-transitory computer-readable storage medium of claim 21, the set of instructions further comprising:

a calculating code segment for calculating a time elapsed since transmission of the training sequence set in accordance with the higher version of the computer bus and interconnection protocol, wherein the first device transmits a training sequence including symbols set in accordance with the lower version of the computer bus and interconnection protocol on a condition that the time elapsed reaches a predetermined threshold.

24. The non-transitory computer-readable storage medium of claim 21, wherein the instructions are hardware description language (HDL) instructions used for the manufacture of a device.

* * * * *